United States Patent
Le Saux et al.

(10) Patent No.: US 11,150,476 B2
(45) Date of Patent: Oct. 19, 2021

(54) METHOD FOR PROVIDING A DISPLAY UNIT FOR AN ELECTRONIC INFORMATION DEVICE

(71) Applicant: Essilor International, Charenton-le-Pont (FR)

(72) Inventors: Gilles Le Saux, Charenton-le-Pont (FR); Aude Bouchier, Charenton-le-Pont (FR); Pauline Colas, Charenton-le-Pont (FR); Loic Quere, Charenton-le-Pont (FR); Matthieu Guillot, Charenton-le-Pont (FR); Jean Marc Cornier, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 16/316,919

(22) PCT Filed: Jul. 5, 2017

(86) PCT No.: PCT/EP2017/066749
§ 371 (c)(1),
(2) Date: Jan. 10, 2019

(87) PCT Pub. No.: WO2018/011031
PCT Pub. Date: Jan. 18, 2018

(65) Prior Publication Data
US 2019/0293938 A1    Sep. 26, 2019

(30) Foreign Application Priority Data

Jul. 12, 2016  (EP) .................................... 16305894

(51) Int. Cl.
*G02B 27/01*  (2006.01)
*G02C 7/06*   (2006.01)
(Continued)

(52) U.S. Cl.
CPC ..... *G02B 27/0172* (2013.01); *G02B 27/0179* (2013.01); *G02C 7/02* (2013.01);
(Continued)

(58) Field of Classification Search
CPC ...... G02B 27/0172; G02C 7/027; G02C 7/02; G06T 19/006
See application file for complete search history.

(56) References Cited

U.S. PATENT DOCUMENTS

2008/0273246 A1   11/2008  Moliton et al.
2008/0316427 A1   12/2008  Fisher et al.
(Continued)

FOREIGN PATENT DOCUMENTS

| CN | 104025158 A | 9/2014 |
| WO | WO 2015/150269 A1 | 10/2015 |
| WO | WO 2015/158601 A1 | 10/2015 |

OTHER PUBLICATIONS

International Search Report dated Aug. 11, 2017 in PCT/EP2017/066749 filed on Jul. 5, 2017.
Office Action dated May 21, 2020, in Chinese Patent Application No. 201780026648.8 (w/English translation), 16 pages.

*Primary Examiner* — Yi Yang
(74) *Attorney, Agent, or Firm* — Oblon, McClelland, Maier & Neustadt, L.L.P.

(57) ABSTRACT

A method for providing a display device for an electronic information device configured to display a virtual image to a user, the electronic information device including an optical element having a nonzero optical power and configured to be positioned in front of an eye of a user, the display device including a light source and a guide element configured to guide optical beams emitted by the light source to the eye of the user to allow viewing of the virtual image, the method including: providing a value of a parameter of the virtual image; and determining an optimum value of a display
(Continued)

parameter of the display device from at least one optical power at a point of the optical element and from the value of the parameter of the virtual image.

15 Claims, 2 Drawing Sheets

(51) Int. Cl.
*G02C 7/02* (2006.01)
*G06F 3/01* (2006.01)

(52) U.S. Cl.
CPC .............. *G02C 7/061* (2013.01); *G06F 3/013* (2013.01); *G02B 2027/014* (2013.01); *G02B 2027/0178* (2013.01); *G02B 2027/0187* (2013.01)

(56) References Cited

U.S. PATENT DOCUMENTS

| | | | |
|---|---|---|---|
| 2009/0296043 A1* | 12/2009 | Moliton | G02B 27/0172 351/158 |
| 2010/0045927 A1 | 2/2010 | Moliton et al. | |
| 2010/0171922 A1* | 7/2010 | Sessner | G02B 27/0172 351/158 |
| 2014/0375691 A1* | 12/2014 | Kasahara | G06T 11/60 345/633 |
| 2015/0016777 A1 | 1/2015 | Abovitz et al. | |
| 2015/0219881 A1* | 8/2015 | Munro | G02B 13/22 359/663 |
| 2017/0192250 A1* | 7/2017 | Rousseau | G02C 7/027 |

\* cited by examiner

METHOD FOR PROVIDING A DISPLAY UNIT FOR AN ELECTRONIC INFORMATION DEVICE

The subject of the invention is a method for providing a display device for an electronic information device and an electronic information device including such a display device.

The field of the invention is that of electronic information devices, and in particular that of augmented reality devices.

It is known to equip a human being with an augmented reality viewing apparatus enabling him to see the surroundings in which he is situated and images added into his field of view at the same time, thus augmenting the reality perceived visually by the user.

Such an apparatus includes a semitransparent screen, placed in the field of view of the user and onto which the augmented reality images are projected. This screen is formed for example by the lens of a pair of glasses worn by the user.

The apparatus may be equipped with orientation sensors that make it possible to determine the gaze direction of the user, and in particular the position of his head with respect to the surroundings. Thus, the images superimposed into the natural field of view of the user are positioned so as to match the surroundings perceived visually by the user.

However, some users need to wear ophthalmic lenses in order to correct defects with their vision. In this case, an optical element, such as an ophthalmic lens, is placed such that the light beams from a real object situated in the user's field of view passes through it at least once, the information image also possibly being able to pass through the optical element as well. The addition of this lens will generate a change in the properties of the real object, and possibly those of the information image. These changes may be different between the real object and the virtual image, which may be detrimental to the wearer's perception of the superimposition of the virtual images with the real object.

In some cases, it is also preferable, even for a wearer who does not have any vision defects, to encapsulate the display device with an optical element situated upstream and an optical element situated downstream of the display device, for example in order to protect the display device or in order to provide additional optical functions (photochromic, electrochromic, tinting, polarization, etc. function) via the optical elements.

These optical elements, if they have a nonzero power, for example nonzero but opposing powers between the upstream optical element and the downstream optical element, will still change the properties of the real object and of the virtual image differently.

Therefore, there is a need to provide an electronic information device suitable for a wearer and in particular when this device incorporates an optical element with nonzero power.

The wearer's prescription is a set of optical characteristics, in particular of optical power and astigmatism, that are determined by an ophthalmologist in order to correct the vision defects of the user, for example by way of a lens positioned facing his eye. For example, the prescription for a progressive addition lens comprises optical power and astigmatism values at a reference point and, where applicable, an addition value.

Therefore, one objective of the present invention is to propose a method for providing a display device for an electronic information device tailored to a wearer, and in particular to the prescription of a wearer.

To this end, one subject of the invention is a method for providing a display device for an electronic information device intended to display a virtual image to a user, the electronic information device including an optical element having a nonzero optical power and intended to be positioned in front of an eye of a user, the display device comprising a light source and a guide element intended to guide optical beams emitted by the light source to the eye of the user so as to allow viewing of the virtual image, the method including at least the following steps:

a step of providing a value of a parameter of the virtual image; and a step of determining an optimum value of a display parameter of the display device from at least one optical power at a point of the optical element and from the value of the parameter of the virtual image.

Advantageously, the method makes it possible to determine the impact of the optical element on the virtual image, in particular on the virtual distances perceived by the wearer, i.e. the display distance of the virtual image, or on the perceived size of the virtual objects that are displayed.

Furthermore, the display device may then be changed in order to compensate the impact of the optical element on the virtual image, such that the perception of the real image and the perception of the virtual image are correct at the same time, in particular in terms of sharpness and size of the images.

The method according to the invention may also comprise one or more of the following features, considered individually or in any possible combination:

the parameter of the virtual image is a parameter chosen from the list consisting of the distance in a display orientation of the virtual image, the position of the virtual image and the size of the virtual image;

the display parameter of the display device is a parameter chosen from the list consisting of the position of the image to be displayed, for example in pixel coordinates, the size of the image to be displayed, for example in number of pixels, a focal plane of the display device;

the method furthermore comprises a step of providing a guide element having at least one unique intrinsic parameter whose value is equal to the determined optimum value;

the guide element has an adjustable intrinsic parameter, the method furthermore includes a step of adjusting the intrinsic parameter of the guide element to the determined optimum value;

the adjustable intrinsic parameter of the guide element comprises a plurality of predetermined values, and the intrinsic parameter of the guide element is adjusted to one of the predetermined values, such that the difference between this value and the determined optimum value is minimal;

the guide element includes an adjustable system for returning the optical beams to the eye of the user, and the step of adjusting the intrinsic parameter of the guide element includes a step of adjusting the return system, such that the value of the intrinsic parameter of the guide element is equal to the determined optimum value;

the method comprises a step of selecting the guide element of the display device from among a plurality of guide elements, each guide element having a unique intrinsic parameter, the guide element is chosen such that the difference between the value of its unique intrinsic parameter and the determined optimum value is minimal;

the display device comprises a second optical element having an optical power and intended to be passed through by the optical beams directed by the guide element to the eye of the user, and the guide element has an intrinsic parameter, and the method includes a step of determining at least one optical power of the second optical element depending on the optimum value of the display parameter of the display device and on the value of the intrinsic parameter of the guide element;

the optical power of the optical element depends at least partly on the user's prescription;

the electronic information device comprises a system for tracking the gaze direction of the eye of the user and the optimum value of the display parameter of the display device is furthermore determined from the gaze direction of the user;

the electronic information device is an augmented reality device configured to display the virtual image superimposed on a real object, and includes at least one sensor configured to determine the value of a parameter of the real object corresponding to the parameter of the virtual image, and the value of the parameter of the virtual image that is provided is equal to the value of the parameter of the real object seen through the information device, which value is determined by the sensor;

the method includes a step of updating the optical power of the optical element, and the optimum value of the display parameter of the display device is furthermore determined from the updated optical power of the optical element;

the optical power of the optical element comprises the spherical and/or cylindrical and/or prismatic power.

The invention also relates to an IT program product, such as a computer program product, comprising one or more sequences of instructions that are stored and accessible to a processor, and which, when they are executed by the processor, lead the processor to execute at least one step of the method according to the invention.

The invention also relates to a storage medium able to be read by a computer means, the storage medium comprising at least one program, and wherein the program leads the computer to execute the steps of the method according to the invention.

Another subject of the invention is an apparatus comprising a processor configured to store one or more sequences of instructions and to execute at least one of the steps of the method according to the invention.

Unless indicated otherwise, terms such as 'calculate', 'determine', 'evaluate' or the like refer to the action of a computer means that manipulates and/or transforms physical data, such as electronic data or amounts in registers and/or memories, into other physical data, such as amounts in memories of the computer system, registers or other storage, transmission or display means.

Furthermore, the embodiments of the present invention are not described with reference to a particular programming language. A variety of programming languages may be used to implement the method according to the invention.

Another subject of the invention relates to an electronic information device intended to display a virtual image to a user, the virtual image having a parameter of predetermined value, comprising:

an optical element having a nonzero optical power and intended to be positioned in front of an eye of a user, and a display device comprising a light source and a guide element intended to guide optical beams emitted by the light source to the eye of the user so as to allow viewing of the virtual image, the display device having a display parameter whose value depends on at least one optical power at a point of the optical element and on the value of the parameter of the virtual image.

The electronic device according to the invention may also comprise one or more of the following features, considered individually or in any possible combination:

the display device comprises a guide element of guided optic type or a free-space guide element;

the display device comprises a light-field display and a guide element;

the guide element has an intrinsic parameter and the display device comprises a second optical element having an optical power and intended to be passed through by the optical beams guided by the guide element to the eye of the user, at least one optical power at a point of the second optical element depending on the optimum value of the display parameter of the display device and on the value of the parameter of the guide element;

the optical element is an optical lens having a unifocal and/or progressive design and/or is an active lens;

the optical element is an optical lens of which one of the surfaces is spherical.

Other features and advantages of the present invention will emerge upon reading the description and the following figures.

It should be noted that the sole aim of these drawings is to illustrate the text of the description, and they do not in any way constitute a restriction of the scope of the invention.

In the various figures, analogous elements are denoted using identical references.

The invention relates to the field of electronic information devices intended to display a virtual image to a user, and in particular to augmented reality devices.

Figure 1:
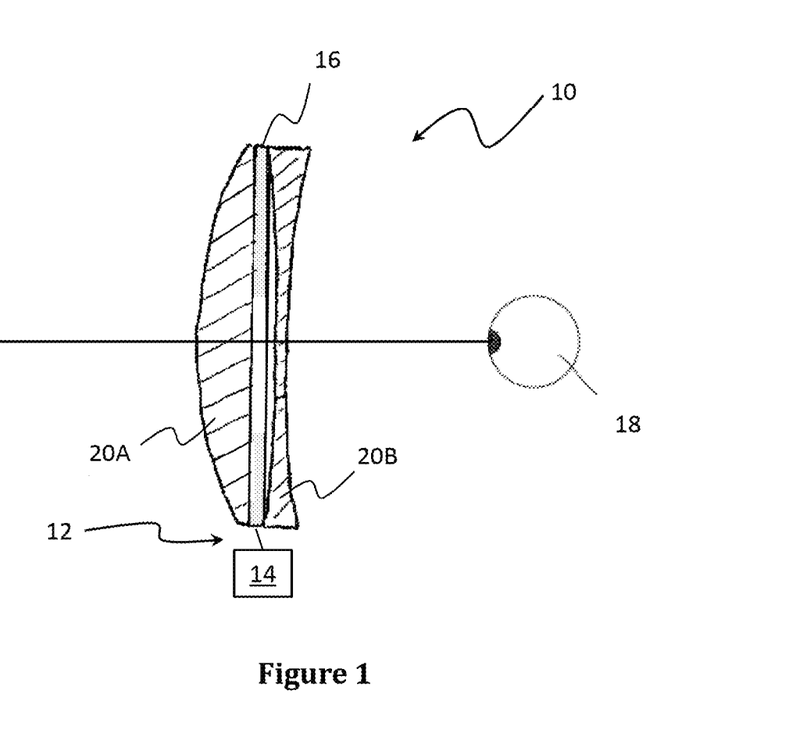
FIG. 1 illustrates an electronic information device according to one embodiment of the invention.

In particular, and with reference to FIG. 1, such an electronic information device 10 according to the invention includes a display device 12 comprising a light source 14 and a guide element 16 intended to guide optical beams emitted by the light source 14 to at least one eye 18 of a user so as to allow viewing of a virtual image.

Preferably, the display device comprises a guide element of guided optic type or a free-space guide element.

According to another example, the display device comprises a light-field display.

The electronic information device 10 furthermore includes at least one optical element 20 having a nonzero optical power and intended to be positioned in front of the eye of the user intended to receive the optical beams emitted by the light source 14. In FIG. 1, two optical elements are illustrated. The first one, called rear optical element 20B, is placed between the eye 18 of the user and the display device 12, and the second one, called front optical element 20A, is placed such that the display device 12 is placed between the two optical elements 20A and 20B.

The optical power of the optical elements preferably depends on at least part of the user's prescription. Only one of the two optical elements may depend on at least part of the user's prescription.

Furthermore, the optical power of the optical element advantageously comprises the spherical and/or cylindrical and/or prismatic power.

Preferably, the optical element 20 is an optical lens having a unifocal and/or progressive design. The optical element 20 may also be an active lens.

In addition, the optical element may be an optical lens of which one of the surfaces is spherical.

According to the invention, the virtual image has a parameter of predetermined value, and the display device has a display parameter whose value depends on at least one optical power at a point of the optical element and on the value of the parameter of the virtual image.

Preferably, the parameter of the virtual image is:
the distance in a display orientation of the virtual image,
the position of the virtual image, or
the size of the virtual image.

Preferably, the display parameter of the display device is:
the position of the image to be displayed, for example in pixel coordinates,
the size of the image to be displayed, for example in number of pixels, or
a focal plane of the display device.

The value of the display parameter of the display device is determined by a method according to the invention, such as will be described hereinafter.

Thus, such an electronic information device according to the invention is designed to take into account changes made by the optical element(s) in terms of prism, power, aberrations, etc. to the virtual image.

Figure 2:
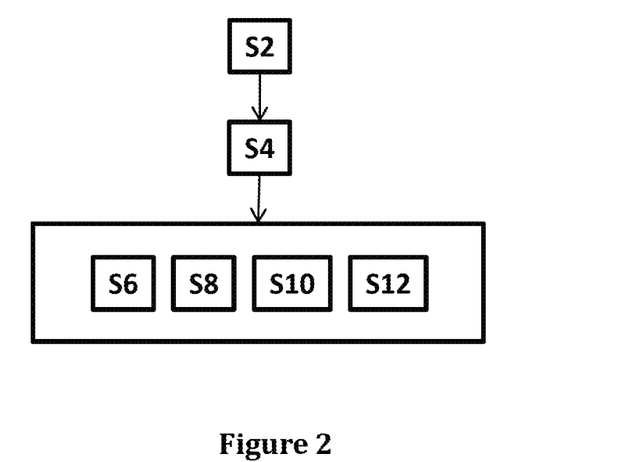
FIG. 2 shows a flow chart of the steps of a method for providing a display device for an electronic information device according to one embodiment of the invention.

A method for providing such a display device for an electronic information device intended to display a virtual image to a user according to the invention will now be described with reference to FIG. 2.

The method includes a step S2 of providing a value of a parameter of the virtual image, followed by a step S4 of determining an optimum value of a display parameter of the display device from at least one optical power at a point of the optical element(s) 20A, 20B and from the value of the parameter of the virtual image.

During step S2, a value of a parameter of the virtual image is provided.

Preferably, the parameter of the virtual image is:
the distance in a display orientation of the virtual image,
the position of the virtual image, or
the size of the virtual image.

During step S4, an optimum value of a display parameter of the display device 12 is determined from at least one optical power at a point of the optical element(s) and from the value of the parameter of the virtual image.

The optical power of at least one of the optical elements of the electronic information device preferably depends on at least part of the user's prescription. Advantageously, the optical power of the optical element comprises the spherical and/or cylindrical and/or prismatic power.

Preferably, the display parameter of the display device is:
the position of the image to be displayed, for example in pixel coordinates,
the size of the image to be displayed, for example in number of pixels, or
a focal plane of the display device.

According to one preferred embodiment, the method furthermore includes a step S6 of providing a guide element having at least one unique intrinsic parameter whose value is equal to the determined optimum value.

According to another embodiment, the guide element 16 of the display device 12 has an adjustable intrinsic parameter. According to this embodiment, the method furthermore includes a step S8 of adjusting the intrinsic parameter of the guide element 16 to the determined optimum value.

The intrinsic parameter of the guide element 16 may be able to be adjusted continuously or discretely, that is to say include a plurality of predetermined values. In the latter case, the intrinsic parameter of the guide element 16 is adjusted to one of the predetermined values, such that the difference between this value and the determined optimum value is minimal.

If the intrinsic parameter of the guide element 16 is able to be adjusted continuously, preferably if the guide element includes an adjustable system for returning the optical beams to the eye of the user, step E8 of adjusting the intrinsic parameter of the guide element 16 to the determined optimum value includes a step of adjusting the return system, such that the value of the intrinsic parameter of the guide element is equal to the determined optimum value.

This return system may be able to be adjusted in a fixed or active manner. For example, the return system able to be adjusted in a fixed manner may be a holographically recorded mirror or diffractive elements taking account of the corrections due to the effects of the optical element 20 on the virtual image to be displayed. A return system able to be adjusted in an active manner is for example an active holographic mirror or an active diffractive element taking account of the corrections due to the effects of the optical element 20 on the virtual image to be displayed.

According to another embodiment, the method includes a step S10 of selecting the guide element 16 of the display device from among a plurality of guide elements, each guide element having a unique intrinsic parameter. The guide element is then chosen such that the difference between the value of its unique intrinsic parameter and the determined optimum value is minimal.

According to another embodiment, the display device 12 comprises a second optical element having an optical power and intended to be passed through by the optical beams directed by the guide element 16 to the eye 20 of the user. The guide element furthermore has an intrinsic parameter.

The method according to this embodiment includes a step of determining at least one optical power of the second optical element depending on the optimum value of the display parameter of the display device and on the value of the intrinsic parameter of the guide element.

In this embodiment, this second optical element, called corrective element, will compensate the effects of the optical element 20 of the electronic information device. This element may be fixed, for example an optical system calculated for the effects of the optical element, or variable, for example an optical system based on membrane, liquid-crystal, SLM, etc. lenses. Such a variable corrective element would make it possible to compensate the effects and to add focusing distance or virtual image position variations in real time.

Advantageously, the electronic information device may include a system for tracking the gaze direction of the eye of the user and the optimum value of the display parameter of the display device is then also determined depending on the gaze direction of the user.

According to one preferred embodiment of the invention that is compatible with the previous ones, the electronic information device is an augmented reality device configured to display the virtual image superimposed on a real object.

The electronic information device includes at least one sensor configured to determine the value of a parameter of the real object corresponding to the parameter of the virtual image. In this case, the value of the parameter of the virtual image that is provided is equal to the value of the parameter of the real object seen through the optical element, which value is determined by the sensor.

Advantageously, the method according to the invention may include a step of updating the optical power of the optical element. In this case, the optimum value of the display parameter of the display device is furthermore determined from the updated optical power of the optical element.

Thus, such a method according to the invention makes it possible to change the display of the virtual image so as to take into account the effects added by the optical element(s). This taking into account as indicated above may be performed either by adding what is known as a corrective element positioned so as to be passed through by the optical beams directed by the guide element to the eye of the user, or directly via the optional system for returning the image to the eye, or directly via the display by using for example what is known as a 'smart' display of phase SLM or light-field display (LFD) type or by correcting files to be displayed for simple cases by using a conventional screen of OLED, LCD, projector etc. type, or else by combining these two methods.

All of these embodiments may be implemented individually or in combination, each element taking into account all or some of the correction of the virtual image.

According to one example, the device for returning the image may keep corrections that are correctly characterized and fixed (corrections linked to the geometry of the system, main visual corrections (myopia, astigmatism, etc.) for example) and other corrections may be made via the display.

According to another example, it is possible to correct far vision (FV) via the device for returning to the eye, whereas the display may make additions in the case of use of a progressive lens or of the display of an image in near vision (NV). If the wearer's myopia does not vary or varies very little, but his near vision changes, this could be enough to guarantee him good vision of the virtual image, without influencing his vision of the real world.

By virtue of active elements, it is advantageously possible to perform tracking of the correction of the virtual image. The wearer may then act on this correction, via a terminal of tablet or smartphone type, for example, so as to improve his vision of the virtual image if necessary. In this case, the electronic information device may be updated and thus improved continuously by virtue of learning, of tracking the change in the prescription of a wearer, etc.

Exemplary embodiments of the invention will now be presented with consideration to an electronic information device including a waveguide able to generate different virtual distances in order to display the image, continuously or discretely, and to which at least one passive optical element with nonzero power is bonded.

Case A: Changing the Display Distance of the Virtual Image

In this example, the electronic information device is intended for an emmetropic wearer and includes a display device of guided optic type and an optical element with nonzero power bonded to the front face of the guide element and another optical element with opposing power bonded to the rear face. Thus, the real optical power is zero, the real world is perceived sharply and the properties of the real object are not changed by the electronic information device due to the absence of power. By contrast, the properties of the virtual image are changed by the optical element bonded to the rear face, as the wearer perceives a virtual image that passes through this optical element. The virtual image is thus changed with regard to the distance perceived by the user, with regard to its size, and possibly its position. Thus, if it is desired to display a virtual image whose position, size or distance are linked to the real object that is observed, the wearer, in the absence of implementation of the invention, will perceive a virtual image at an inadequate position, size or distance.

It is proposed hereinafter to change the display parameter relating to the focal plane, such that the virtual image is at a distance that corresponds to the distance of the real object that is viewed, thereby enabling both the real object and the virtual image to be seen sharply.

If the power of the rear optical element has a value Pwar (in diopters) and the device has to display a virtual image at a proximity Pprox (=1/D, where D is the display distance of the virtual object), the following must hold true:

$$P\text{image} = P\text{prox} - P\text{war} \quad (1a)$$

or $$P\text{image} = P\text{prox} + P\text{wav} \quad (1b)$$

where Pimage is the proximity of the virtual image generated by the display in the absence of the optical element on the rear face. Of course, exact calculation of Pimage by ray tracing may also be contemplated.

Thus, if Pwar=−1 D and Pprox=0, i.e. a virtual object at infinity, we obtain Pimage=1 D, i.e. a virtual image positioned 1 m behind the screen, and the wearer perceives the virtual and real images sharply in far vision at the same time. The proximity Pprox in this case corresponds to the proximity of the virtual image perceived by the user. This value may be chosen depending on the applications or uses of the wearer. For example, if the wearer wants a virtual distance suited to reading in near vision 40 cm away, a suitable proximity value Pprox may be −2.5 D. Thus, the virtual image and the real object (a book for example) will be seen sharply at the same time. For an activity requiring far vision (driving for example), a proximity value of the virtual image Pprox=0 D is suitable, this corresponding to the proximity of a real object situated far in front of the driver.

In the case of a display device with continuous distance variation, Pimage is then adjusted to the exact value, otherwise the value close to the desired value Pimage is chosen from among the discrete values.

As an alternative, the distance Pimage is adjusted such that it is not more than 2 D the desired value Pimage so as to limit the accommodation.

As an alternative, if the device has just one value Pimage or a limited number of values of Pimage, the display device may be manufactured accordingly or selected depending on Pwav so as to comply with the above relationships 1a, 1b.

Alternatively, depending on the set of available display devices, the characteristics of a corrective optical element intended to be bonded on the front face may be determined so as to have sharpness of the real object and of the virtual image at the same time.

If the optical element has astigmatism, then Pwav is a function of the angle, and the power Pimage of the display device will be changed depending on the orientation θ.

In the case of a free-space display, formulae (1a) and (1b) are no longer applicable, as the virtual image passes through the rear optical element twice before reaching the eye. In a first approximation, it is therefore possible to consider that the power seen by the display has a value 2Pwar and apply the following formula:

$$Pimage = Pperceived - 2 \cdot Pwar \quad (1c)$$

Case B: Change Depending on Refraction

In the two following simplified examples, the wearer does not have astigmatism.

Case of a Display Device of Guided Optic Type

If the wearer has a certain refraction that is not entirely supported by the rear optical element, then the wearer will not see the real object for which his refraction is compensated and the virtual image sharply at the same time. The defect of correction of the virtual image is equal to the power of the front optical element, and may be compensated by changing the distance of the virtual image, for example:

if it is desired to see a real object at infinity and the virtual image sharply at the same time, Pprox=0 D; and if it is desired to see a real object 33 cm away and the virtual image sharply at the same time, Pprox=−3 D, where Pprox is the proximity of the virtual image, that is to say the distance between the lens and a real plane at which the virtual image and the real object are seen sharply at the same time.

Pimage is determined by the following relationships:

$$Pimage = Pprox + Pwav(2a) = Pprox + Pwearer - Pwar \quad (2b)$$

The wearer is thus corrected in terms of his real vision and also in terms of his virtual vision.

Just like for the example of case A, it is possible to take the exact value Pimage if it is possible to adjust the display device continuously, or choose a most appropriate value, or choose a display device from a set of display devices so as to have most suitable values.

Likewise, the device may comprise a corrective optical element on the front face, the parameterization of the display being determined from the power of the front optical element.

Case of a Free-Space Display:

In the case of a free-space display, formulae (2a) and (2b) are no longer applicable, as the virtual image passes through the rear optical element twice before arriving at the eye. In a first approximation, the power seen by the display has a value 2Pwar and the following formula is then applied:

$$Pimage = Pprox + Pwearer - 2 \times Pwar \quad (2c)$$

Case of a Progressive Optical Element on the Rear Face

If the rear optical element has a progressive surface, then Pwar is a function of the gaze direction (α,β) and Pwar has a spherical power and an astigmatism: PwarS(α,β) and PwarA(α,β) The above formulae apply for each gaze direction.

It is thus possible to correct the virtual image such that it is seen sharply, without an astigmatism defect, over the whole field (α,β), the real object being sharp only in the far, intermediate and near view zones.

Case C: Changing the Size and/or the Position of the Virtual Image

In this example, the wearer has a nonzero prescription. The wearer sees the external world with a magnified or compressed effect depending on the power of the lens (hypermetropia/myopia). This effect is due to the power of the lens and to the lens-eye distance, this distance being the distance between the eye and the electronic information device.

We have Greal=1/(1−DVO·Pwearer) (3) where DVO is the lens-eye distance, Pwearer the prescription of the wearer (which may be a function of θ if astigmatism is present).

For example, for a DVO of 14 mm, Pwearer=−1 D (myopia), the magnification Greal has a value 0.986.

For a virtual image positioned at Pimage=0, we have:

$$Gvirtual = 1/(1-DVO \cdot Pwar) \quad (4)$$

For example, for Pwav=2 D and Pwar=−3 D, the magnification Gvirtual has a value 0.96.

There is therefore a different magnification for the real image and the virtual image, thereby generating problems for the augmented reality when it is desired to accurately superimpose a virtual image with a real object.

In this case, the size of the virtual objects is changed such that the real/virtual magnifications are identical or very close. It is possible to apply a numerical magnification factor to the virtual image, or change the size (in pixels) of the virtual image in order to reduce the difference in magnification between the real and virtual images, without compensating the whole of this difference.

It is also possible to take into account the prismatic effects of the optical elements since the prismatic effects applying to the virtual image and the real object differ, in particular when moving away from the optical axis of the system. Specifically, these different prismatic effects for the virtual image and the real object impact the display quality for the augmented reality, as the positions of the virtual images do not correspond to the positions of the real objects to be highlighted. These prismatic effects, if they are not corrected, may also prevent the simultaneous merging of the virtual images and of the real objects when a binocular system is used. To perform this correction, it is then possible to change the position (in pixels) of the virtual image. The new position of the virtual image may be determined by ray tracing simulation, such that the direction of a light ray leaving a real object and passing via the eye of the wearer and the direction of a light ray leaving the display at the position of the image and passing via the eye of the wearer are identical.

Figure 3:
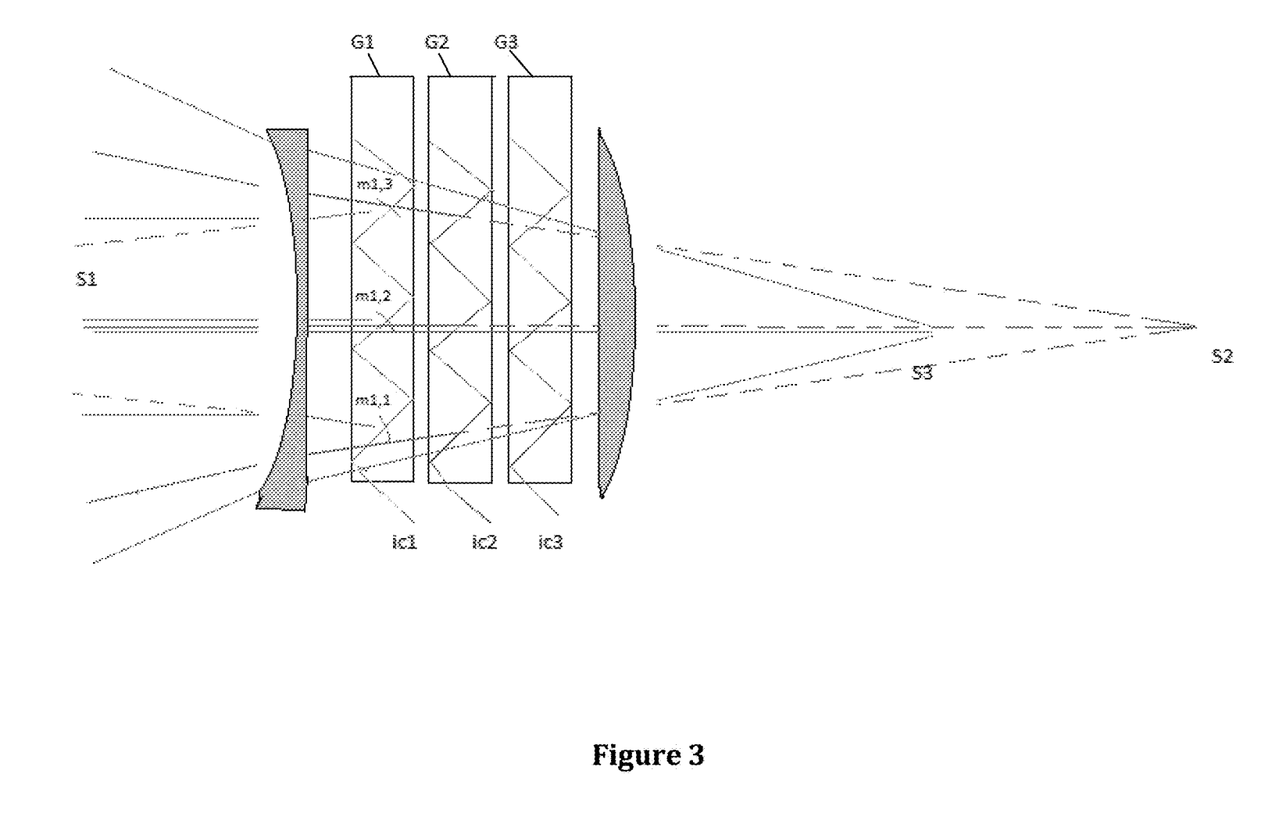
FIG. 3 illustrates an exemplary embodiment of the invention in which an electronic information device according to the invention includes three waveguides able to generate different virtual distances in order to display the image.

Another exemplary embodiment of the invention will now be presented with reference to FIG. 3, which illustrates an electronic information device including a plurality of waveguides able to generate different virtual distances in order to display the image.

In the example illustrated, the electronic information device includes two optical elements, each with nonzero power: a convex lens on the front face and a concave lens on the rear face. The optical powers of the optical elements are +1 D and −1 D, such that the electronic information device is provided for an emmetropic eye (S=0 D).

The electronic information device includes 3 waveguides denoted G1, G2, G3, allowing images to be displayed at distances denoted d1, d2, d3 positioned at S1, S2, S3.

These waveguides have an image injection zone denoted ic1, ic2 and ic3 for 'in coupling'. The light beams reflect off the walls of the various waveguides, which also each include elements for extracting the light beam, called 'out coupling' and denoted mi,j, where i is the index of the waveguide and j the index of the element. These extraction elements make it possible to extract part of the light beam guided in each waveguide, while at the same time making it possible to determine the orientation of the output beam and also the curvature thereof.

In this way, the various beams extracted by the various extraction elements of one and the same guide (m1,1; m1,2; m1,3 for example for G1) converge toward S1, and the curvature of the wave surface corresponds to the distance d1. Thus, the observer sees a light point positioned at a distance d1 in the absence of an optical element.

In this case, we have chosen d1=−1 m, this meaning that, when the beams extracted from G1 pass through the concave optical element, they are refocused, and the wearer therefore sees a light point situated at infinity.

Likewise, the distances d2 and d3 are determined so as to take into account the effect of the power of the rear optical element.

The extraction elements may be mirrors of Fresnel mirror type with a partially reflective treatment that are encapsulated inside the waveguide. They may also be holographic mirrors, thereby making it possible to record each of the mirrors on the basis of the desired distance characteristics via a standard holographic recording and the use of a photosensitive resin inside the waveguide, for example. It is therefore possible in this case to program the displays depending on the optical element that will be used.

FIG. 3 illustrates the reflections and extractions for an exemplary beam of parallel rays that is coupled to the waveguide. The injection into the waveguide is not shown here; it may involve solutions conventionally described in patents US2015016777 or US 20140003762.

It is noted that, in the example illustrated in FIG. 3, the curvatures of the mirrors vary: concave for G1, convex for G2, more strongly convex for G3, as do the average angles of these mirrors, so as to ensure convergence of the extracted beams toward the points S1, S2, S3.

The invention claimed is:

1. A method for providing a display device for an electronic information device configured to display a virtual image to a user, the electronic information device including an optical element having a nonzero optical power and configured to be positioned in front of an eye of a user, the display device including a light source and a guide element configured to guide optical beams emitted by the light source to the eye of the user to allow viewing of the virtual image, the method comprising:
providing a value of a parameter of the virtual image;
determining an optimum value of a display parameter of the display device from at least one optical power at a point of the optical element and from the value of the parameter of the virtual image;
wherein the display device comprises a second optical element having an optical power and configured to be passed through by the optical beams directed by the guide element to the eye of the user, and the guide element has an intrinsic parameter,
wherein the method further comprises determining at least one optical power of the second optical element depending on the optimum value of the display parameter of the display device and on the value of the intrinsic parameter of the guide element, and
further comprising selecting the guide element of the display device from among a plurality of guide elements, each guide element having a unique intrinsic parameter, the guide element is chosen such that the difference between the value of its unique intrinsic parameter and the determined optimum value is minimal,
wherein the optical power of the second optical element is a corrective element and depends on at least part of a prescription of the user; and
wherein the second optical element is configured to compensate effects of the first optical element of the electronic information device.

2. The method as claimed in claim 1, wherein the parameter of the virtual image is a parameter chosen from: distance in a display orientation of the virtual image; position of the virtual image; size of the virtual image.

3. The method as claimed in claim 1, wherein the display parameter of the display device is a parameter chosen from: position of the image to be displayed; position of the image to be displayed in pixel coordinates; size of the image to be displayed; size of the image to be displayed in number of pixels; a focal plane of the display device.

4. The method as claimed in claim 1, further comprising providing a guide element having at least one unique intrinsic parameter whose value is equal to the determined optimum value.

5. The method as claimed in claim 1, wherein the guide element has an adjustable intrinsic parameter, the method further comprising adjusting the intrinsic parameter of the guide element to the determined optimum value.

6. The method as claimed in claim 5, wherein the adjustable intrinsic parameter of the guide element includes a plurality of predetermined values, and the intrinsic parameter of the guide element is adjusted to one of the predetermined values, such that the difference between the one value and the determined optimum value is minimal.

7. The method as claimed in claim 5, wherein the guide element includes an adjustable system for returning the optical beams to the eye of the user, and wherein the adjusting the intrinsic parameter of the guide element includes adjusting the return system, such that the value of the intrinsic parameter of the guide element is equal to the determined optimum value.

8. The method as claimed in claim 1, wherein the electronic information device includes a system for tracking a gaze direction of the eye of the user, and wherein the optimum value of the display parameter of the display device is further determined from the gaze direction of the user.

9. The method as claimed in claim 1, wherein the electronic information device is an augmented reality device configured to display the virtual image superimposed on a real object, and includes at least one sensor configured to determine the value of a parameter of the real object corresponding to the parameter of the virtual image, and wherein the value of the parameter of the virtual image that is provided is equal to the value of the parameter of the real object seen through the electronic information device, which value is determined by the sensor.

10. The method as claimed in claim 1, further comprising updating the optical power of the optical element, and wherein the optimum value of the display parameter of the display device is further determined from the updated optical power of the optical element.

11. The method as claimed in claim 1, wherein the optical power of the optical element includes spherical and/or cylindrical and/or prismatic power.

12. An electronic information device configured to display a virtual image to a user, the virtual image having a parameter of predetermined value, comprising:
an optical element having a nonzero optical power and configured to be positioned in front of an eye of a user;
a display device comprising a light source and a plurality of guide elements configured to guide optical beams emitted by the light source to the eye of the user to allow viewing of the virtual image, the display device having a display parameter whose value depends on at least one optical power at a point of the optical element and on the value of the parameter of the virtual image;

wherein one of the guide elements has an intrinsic parameter and the display device comprises a second optical element having an optical power and configured to be passed through by the optical beams guided by the guide element to the eye of the user, at least one optical power at a point of the second optical element depending on the optimum value of the display parameter of the display device and on the value of the parameter of the guide element, and each guide element having a unique intrinsic parameter, the guide element is configured to be chosen such that the difference between the value of its unique intrinsic parameter and the determined optimum value is minimal, wherein the optical power of the second optical element is a corrective element and depends on at least part of a prescription of the user, and wherein the second optical element is configured to compensate effects of the first optical element of the electronic information device.

13. The electronic information device as claimed in claim 12, wherein the display device comprises a guide element of guided optic type or a free-space guide element or a light-field display.

14. The electronic information device as claimed in claim 12, wherein the optical element is an optical lens having a unifocal and/or progressive design and/or is an active lens.

15. The electronic information device as claimed in 12, wherein the optical element is an optical lens of which one of the surfaces is spherical.

* * * * *